(No Model.)
C. S. WARDWELL.
PULLEY OR WHEEL.
No. 328,158. Patented Oct. 13, 1885.
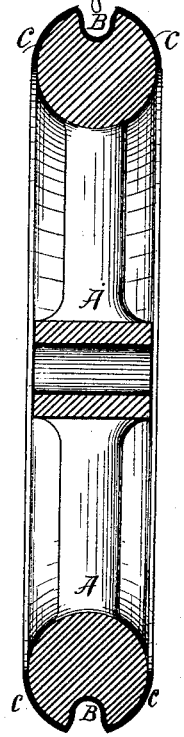
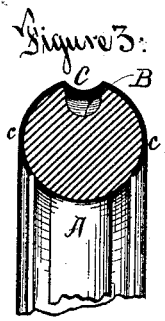
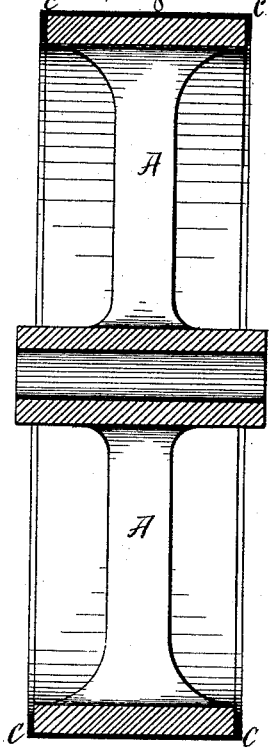
WITNESSES:
Joseph L. Levy.
John H. Ives.
INVENTOR
Claisau S. Wardwell
BY Phillips Abbott
his ATTORNEY

UNITED STATES PATENT OFFICE.

CLAISON S. WARDWELL, OF STAMFORD, CONNECTICUT.

PULLEY OR WHEEL.

SPECIFICATION forming part of Letters Patent No. 328,158, dated October 13, 1885.

Application filed August 1, 1885. Serial No. 173,305. (No model.)

*To all whom it may concern:*

Be it known that I, CLAISON S. WARDWELL, a citizen of the United States, and a resident of Stamford, in the county of Fairfield and State of Connecticut, have invented certain new and useful Improvements in Pulleys and Wheels, of which the following is a specification.

My invention consists in applying to the surface of pulleys, driving-wheels, and similar mechanical devices a covering of non-metallic substance, which will have the quality of clinging to the belt or cord used for transmitting motion and power, thus preventing slipping of the same on the wheels or pulleys; and my invention further consists in applying the said covering to wheels in which the cord or belt runs in a groove in such manner that there shall be a continuous and automatic tension applied to the cord or belt.

In small machinery—such as drilling-lathes, dental engines, carving-machines, sewing-machines, &c.—the slipping of the belt is a constant source of annoyance, expense, and trouble, requiring continual tightening of the belt, and in some instances the belt must be stretched so tight to prevent slipping that it makes the machine run hard and also wears the journals. By the use of my invention the belt may, if desired, remain quite slack, and yet it will not slip.

In the drawings the same letters indicate the same parts in all the figures.

Figure 1 illustrates a vertical cross-section of my invention applied to a wheel having a groove in it for the belt. Fig. 2 illustrates a vertical cross-section of my invention applied to a flat wheel. Fig. 3 illustrates a vertical cross-section of my invention applied to a grooved wheel in such manner as to secure automatic tension of the belt.

A is the rim of the wheel or pulley. B, Figs. 1 and 3, is the groove formed in the rim of the wheel or pulley for the reception of the cord or belt. C is a rubber covering for the face of the wheel. This rubber covering is preferably made in the form of a continuous band or circular ribbon, smaller than the wheel or pulley over which it is to be used, so that it may be stretched tightly thereon, and will then by its elasticity hug closely to the wheel. It may thus be made to hug so tightly that it will retain its place without further fastening, or, if desired, it may be secured in place by any suitable cement or in any other suitable manner. I prefer to make it a little wider than the face of the pulley or wheel, as seen in the figures, so that the edges thereof may turn down over the edge of the rim of the wheel, and thus secure better hold on the wheel. It may, however, be made the same size as the wheel, and fastened to its periphery in any suitable manner, and instead of being a ring-shaped piece it may be simply a long strip, the ends abutting against each other, or overlapped, as desired.

In Fig. 3 I illustrate my invention as arranged to secure automatic and permanent tension on the belt. In this figure the covering C is not depressed into the groove B, but, on the contrary, spans or bridges over the same, as shown, entirely around the wheel, preferably, however, sinking somewhat into the groove to act as a guide for the belt to keep it from running off the wheel. The space in the groove under this covering C is empty. The edges of the covering-band at $c\ c$ are securely fastened by cement, or in any other suitable manner, to the surface of the wheel, so that the pressure of the belt will not draw the covering-band into the groove B. The covering-band used for this purpose should be elastic, and preferably of rubber.

It will be readily understood that the belt is to be made of the proper length to fit into the groove, as though the covering-band was not used, and that then the elasticity of the covering-band will take up automatically any deviation in the length of the belt which is likely to arise from ordinary stretching or from different conditions of the atmosphere, which tend to lengthen or shorten belts or belt-cords, the band C being depressed into the bottom of the groove by the pressure of the belt during the revolution of the wheel, and the band of course exerting itself continually to tighten the belt.

This feature of automatic and continuous tension is peculiarly desirable for dental engines and similar apparatus, for the following reasons: It tends to noiselessness in running the machine; it prevents wabbling and jar of the parts, consequent on the wear of the journels, and it absolutely prevents slipping of the belt.

Although I prefer rubber as the material for the covering C, because of its peculiar clinging qualities, elasticity, and durability, still I do not limit myself to it. Leather, cloth, or any other material having the desired adhesive or clinging property may be used; but, as stated, an elastic material must be used to produce the automatic tension illustrated by Fig. 3. Moreover, I do not limit myself to wheels and pulleys to be used on light or small machinery—such as instanced by me—because my invention is equally applicable to any machinery in which belts are used.

Among the benefits resulting from the use of my invention is that idlers are done away with, so far as they are used to give tension to the belt. They are very objectionable in all machinery, and especially in apparatus driven by foot-power, because of the increase of friction, of noise, of oil and oily smell, and danger of getting the clothing, hair, hands, &c., caught in them.

If the covering C should in course of time wear smooth, it should be roughened by revolving the wheel in contact with any suitable instrument or sand-paper, or the like substance, to roughen the surface of the covering again.

Having described my invention, I claim—

1. The combination of a wheel or pulley, A, and an elastic covering, C, made in the form of a ring and of less diameter, and wider than the periphery of the pulley, whereby the covering may be held on the face of the pulley by its own elasticity and by its overlapping edges, substantially as and for the purposes set forth.

2. The combination of a grooved wheel or pulley and an elastic covering attached to the face of the wheel and bridging over the groove therein, whereby the tension of the belt or belt-cord is automatically maintained, substantially as and for the purposes set forth.

3. The described improvement in the manufacture of covered pulleys, consisting in stretching on the face of the pulley an elastic covering made in the form of a ring and of less diameter than the periphery of the wheel upon which it is stretched.

Signed at New York, in the county of New York and State of New York, this 31st day of July, A. D. 1885.

CLAISON S. WARDWELL.

Witnesses:
 JOHN H. IVES,
 CHARLES B. WEBERG.